UNITED STATES PATENT OFFICE.

JOHN L. KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BRAN FOOD.

1,189,133.          Specification of Letters Patent.      Patented June 27, 1916.

No Drawing.      Application filed December 23, 1915.    Serial No. 68,315.

*To all whom it may concern:*

Be it known that I, JOHN L. KELLOGG, a citizen of the United States, residing in Battle Creek, in the county of Calhoun and State of Michigan, have invented a new and useful Improvement in the Manufacture of Bran Food, of which the following is a specification.

My invention relates to the preparation of cereal foods partly or wholly from bran or equivalent edible fibrous materials, with or without the addition of whole wheat flour or any other gelatinous cereal flour, corn starch, or other cereals, or saccharine materials such as New Orleans molasses, sugar syrups, either cane, glucose or maltose, figs, prunes or other fruits.

My invention consists primarily in the addition to the bran, or equivalent fibrous material with or without any of the foregoing additional ingredients, of some laxative material, such as cascara, rhubarb, senna, mineral salts, or the equivalent, in order to produce a more laxative food.

In the present performance of my invention, I prefer to use as the fibrous material the bran obtained from wheat. To the desired quantity of the bran, I prefer to add, although such addition is not essential to my invention, any desired proportion of some other material or materials to assist in binding the bran particles together, in order that they may be rolled out into larger flakes in a later step of the process herein described. For such additional binding material, wheat or other gelatinous cereal flour, corn starch or various saccharine materials, such as New Orleans molasses, sugar syrups, either cane, glucose or maltose, and even figs, prunes or other fruits may be used. To the bran, with or without any of the foregoing additional ingredients, I add a sufficient quantity of some additional laxative material in order to produce a more laxative food. For such laxative material I may use extracts of fruits, marmalades, figs, prunes, cascara, rhubarb, senna, mineral salts or any aromatics, in suitable proportions. The bran is, by preference, first thoroughly mixed with water and washed. The laxative material selected, together with the additional binding material, if used, is added to the cleaned bran. The moistened bran is then, by preference, placed in screen pans and allowed to drain. These pans are then preferably placed in a steam retort and the bran is cooked for a period of usually from twenty to thirty minutes according to the texture of the bran. The temperature used by me is at present by preference about 250° F. The bran should leave the retort in a more or less solid state, which product is by preference dumped into vat driers and dried preferably by passing heated air up through the bran. I find it better not to disturb the bran during the drying process, as I prefer to form the same into as solid a mass as possible. After the drying process, I at present prefer to break the bran mass up into chunks and press the chunks through a sieve so as to break the mass up into uniform particles about the size of a pea. I then prefer to sprinkle water over the bran and allow it to temper for about twenty-four hours. This step, while not essential, has a tendency to bring the mass to a uniform temper and toughen the bran. After the tempering process, if used, the bran is ready for the mills. The milling is preferably done by the usual method employed in making flakes, the treated bran being passed through steel rollers and pressed out into a thin film on the face of the roll, the film being scraped off by means of knives. I find it usually requires ten to fifteen tons pressure on the rolls to break up the fibrous structure of the bran and form the mass into thin film-like flakes. These flakes are then by preference dried and toasted by any approved or usual method, leaving the product ready for the market.

I claim as my invention:

1. A process of preparing a bran food, during the performance of which a mixture of bran and another laxative material is moistened, cooked and dried, the dried mass broken up into small pieces, and the pieces rolled and toasted.

2. A process of preparing a bran food, during the performance of which a mixture of bran, another laxative material and an edible binding material is moistened, cooked and dried, the resulting mass broken into small pieces, and the pieces rolled and toasted.

3. A process of preparing a bran food, during the performance of which a mixture of bran and another laxative material is moistened, cooked for from about twenty to thirty minutes at a temperature of about 250° F., the resulting mass dried, divided into pieces and the pieces toasted.

4. A bran food, consisting of toasted pieces of a moistened, cooked and dried mass of bran and another laxative material.

5. A bran food consisting of toasted and shredded small pieces of a moistened, cooked and dried mass of bran and another laxative material.

JOHN L. KELLOGG.